(12) United States Patent
Koerner et al.

(10) Patent No.: US 10,923,984 B2
(45) Date of Patent: Feb. 16, 2021

(54) ELECTRIC MACHINE WITH IMPROVED DISSIPATION OF WASTE HEAT

(71) Applicant: SIEMENS MOBILITY GMBH, Munich (DE)

(72) Inventors: Olaf Koerner, Nuremberg (DE); Oana Mucha, Nuremberg (DE); Wolfgang Wetzel, Herzogenaurach (DE)

(73) Assignee: Siemens Mobility GmbH, Munich (DE)

( * ) Notice: Subject to any disclaimer, the term of this patent is extended or adjusted under 35 U.S.C. 154(b) by 56 days.

(21) Appl. No.: 16/445,555

(22) Filed: Jun. 19, 2019

(65) Prior Publication Data

US 2019/0386538 A1 Dec. 19, 2019

(30) Foreign Application Priority Data

Jun. 19, 2018 (EP) ...................................... 18178572

(51) Int. Cl.
| | |
|---|---|
| *H02K 5/20* | (2006.01) |
| *B61C 3/00* | (2006.01) |
| *B61C 9/38* | (2006.01) |
| *H02K 5/16* | (2006.01) |
| *H02K 5/18* | (2006.01) |
| *H02K 7/08* | (2006.01) |

(Continued)

(52) U.S. Cl.
CPC ................ *H02K 5/20* (2013.01); *B61C 3/00* (2013.01); *B61C 9/38* (2013.01); *H02K 5/161* (2013.01); *H02K 5/18* (2013.01); *H02K 7/083* (2013.01); *H02K 7/116* (2013.01); *H02K 9/02* (2013.01)

(58) Field of Classification Search
CPC .. H02K 5/20; H02K 5/16; H02K 5/18; H02K 7/08; H02K 7/116; H02K 9/02; H02K 5/15; H02K 1/32; B61C 3/00; B61C 9/38
See application file for complete search history.

(56) References Cited

U.S. PATENT DOCUMENTS

| | | | |
|---|---|---|---|
| 4,742,257 A | * | 5/1988 | Carpenter ................ H02K 9/14 310/57 |
| 5,214,325 A | | 5/1993 | Matson et al. |

(Continued)

FOREIGN PATENT DOCUMENTS

| | | |
|---|---|---|
| DE | 102013200450 A1 | 7/2014 |
| DE | 202013011351 U1 | 2/2015 |

(Continued)

*Primary Examiner* — Naishadh N Desai
(74) *Attorney, Agent, or Firm* — Laurence Greenberg; Werner Stemer; Ralph Locher

(57) ABSTRACT

An electric machine has a rotor on a rotor shaft. The rotor shaft is supported on bearings such that the rotor and the rotor shaft are rotatable around an axis of rotation. The rotor is surrounded radially on the outside by a stator, the stator by a casing. Covering elements are arranged at the axial ends of the rotor and stator, by which the rotor and the stator are enclosed with respect to the environment of the electric machine. One covering element is surrounded radially on the outside, and axially on the side facing away from the rotor and stator there, by an air guide element, the other covering element by an inner ring element. First and second cooling channels running axially are arranged in the casing or between the casing and stator. Rotor channels running axially are arranged in the rotor shaft and/or in the rotor.

15 Claims, 5 Drawing Sheets

(51) Int. Cl.
*H02K 7/116* (2006.01)
*H02K 9/02* (2006.01)

(56) References Cited

U.S. PATENT DOCUMENTS

| | | | |
|---|---|---|---|
| 5,509,381 A | * | 4/1996 | Fisher .................... F01M 9/108 |
| | | | 123/196 R |
| 5,557,153 A | | 9/1996 | Zimmermann |
| 2016/0261171 A1 | | 9/2016 | Mendes et al. |
| 2018/0006529 A1 | * | 1/2018 | Seibicke .................. H02K 9/10 |

FOREIGN PATENT DOCUMENTS

| | | |
|---|---|---|
| EP | 3309941 A2 | 4/2018 |
| GB | 2336038 A | 10/1999 |
| RU | 2129328 C1 | 4/1999 |
| RU | 36585 U1 | 3/2004 |
| RU | 2585131 C1 | 5/2016 |
| SU | 1508313 A1 | 9/1989 |
| SU | 1725322 A1 | 4/1992 |

* cited by examiner

ELECTRIC MACHINE WITH IMPROVED DISSIPATION OF WASTE HEAT

CROSS-REFERENCE TO RELATED APPLICATION

This application claims the priority, under 35 U.S.C. § 119, of European application EP 18178572.6, filed Jun. 19, 2018; the prior application is herewith incorporated by reference in its entirety.

BACKGROUND OF THE INVENTION

Field of the Invention

The present invention takes as its starting point an electric machine,
wherein the electric machine has a rotor which is arranged on a rotor shaft,
wherein the rotor shaft is supported on bearings such that the rotor together with the rotor shaft is rotatable around an axis of rotation,
wherein the rotor is surrounded radially on the outside by a stator and the stator radially on the outside by a casing,
wherein a first and a second covering element are arranged at a first and a second axial end of the rotor and stator, by which the rotor and the stator are enclosed with respect to the environment of the electric machine, and
wherein first cooling channels running axially are arranged in the casing or between the casing and stator.

The present invention furthermore proceeds from a chassis of a railcar, in particular a bogie,
wherein the chassis has a frame,
wherein a wheelset axle is supported in the frame such that the wheelset axle is rotatable around a shaft axis,
wherein an electric machine is fixed in the frame in front or in rear of the wheelset axle as viewed in the direction of travel of the chassis, and
wherein the rotor shaft of the electric machine acts on the wheelset axle via a gearbox.

The aforesaid matters are widely known.

Where there is a high level of utilization of enclosed electric machines with air cooling, intensive heat dissipation for the active parts (that is to say the rotor and stator) is needed over the largest possible surfaces.

In enclosed electric machines of this type in the prior art there is frequently, inside the enclosure, an internal cooling circuit by which heat arising in the rotor, and to some extent also heat arising in the winding head of the stator, is dissipated to the stator. The stator itself is cooled as a result of cooling air being fed into axially oriented cooling channels at one axial end, and emerging from the cooling channels again at the other axial end. The cooling channels are routed on the outer periphery of the stator—that is to say radially on the outside.

The electric machines in the prior art already function fairly well. However they can be improved further.

SUMMARY OF THE INVENTION

The object of the present invention consists in creating options by which dissipation of waste heat arising in the electric machine can be optimized.

According to the invention an electric machine of the type referred to in the introduction is configured as a result of the following:

that the first covering element is surrounded radially on the outside, and axially on the side facing away from the rotor and stator there, by an air guide element, and the second covering element is surrounded radially on the outside, and axially on the side facing away from the rotor and stator there, by an inner ring element,
that second cooling channels running axially are arranged in the casing or between the casing and stator—additionally to the first cooling channels—and rotor channels running axially are arranged in the rotor shaft and/or in the rotor,
that the casing has an air inlet radially on the outside, via which a cooling air flow is fed to the first cooling channels,
that at least one part of the cooling air flow is fed via the first cooling channels to the air guide element or to an interspace between the first covering element and the air guide element, is deflected radially to the inside there, and is then fed via the rotor channels to the inner ring element or to an interspace between the second covering element and the inner ring element, is deflected radially to the outside there and fed to the second cooling channels, and is then routed by the second cooling channels axially through the electric machine, and finally escapes into the environment of the electric machine.

In particular the rotor shaft and, via the rotor shaft, the rotor can be cooled better as a result.

The quantity of first and second cooling channels can be determined according to need. Consequently the use of the plural for the first and second cooling channels must be understood in the generic sense. However at least one first and at least one second cooling channel are present as a minimum. Similar embodiments apply to the rotor channels. Furthermore the designation of the rotor channels as such serves simply to differentiate same from the first and second cooling channels and to make it clear that the rotor channels are constituents of the rotor shaft and/or the rotor. No further significance is attached to the choice of words.

In many instances the casing has a square outer contour as viewed orthogonally to the axis of rotation. In this case the first cooling channels are preferably arranged in at least one side region of the outer contour, in particular in precisely one side region of the outer contour. The air inlet is also situated in this side region in this case. The second cooling channels are preferably arranged in the corner regions of the outer contour in the case of a square outer contour. A square outer contour has—of course—four corner regions. The quantity of corner regions in which the second cooling channels are arranged can be 1, 2, 3, or 4 according to need.

In a particularly preferred embodiment the inner ring element is surrounded radially on the outside at least over part of its periphery by an outer ring element. In this case third cooling channels running axially are also additionally arranged in the casing or between the casing and stator. As a result a further part of the cooling air flow is fed to the outer ring element or to an interspace between the casing and the outer ring element, is deflected tangentially there and fed to the third cooling channels. This part of the cooling air flow is then routed by the third cooling channels axially through the electric machine, prior to it escaping into the environment of the electric machine.

In individual cases the outer ring element can extend completely around the inner ring element. In many cases it is advantageous however if the outer ring element only extends over an angular range of approximately 180° or less, in particular approximately 90° or approximately 45°, as viewed from the axis of rotation. The angular ranges are stated as "approximately" because they have to be slightly larger than the respectively indicated angle in practice in order to cover not only the angular ranges between the third cooling channels but additionally also the third cooling channels themselves as viewed in the peripheral direction around the axis of rotation.

The quantity of third cooling channels can also be determined according to need. The use of the plural for the third cooling channels must consequently—like with the first and second cooling channels—be understood in the generic sense. At least one third cooling channel is present in this embodiment as a minimum however.

At least one of the covering elements is preferably fixed firmly to the rotor. It is therefore fixed on the rotor or on the rotor shaft in a torsion-resistant manner. As a result it is possible for the corresponding covering element to be provided with conveying elements (for example scoops or similar) on the outside. Since the rotor shaft rotates while the electric machine is in operation, this results in the covering element acting like a fan which supports the air flow through the rotor shaft. Where relevant it can even maintain emergency operation in the event of an external fan failing. If there is an internal air circuit, the internal air circuit can also be supported by means of conveying elements on the inside of the corresponding covering element.

Preferably the air guide element and/or the inner ring element each hold one of the bearings. The air guide element and/or the inner ring element are therefore preferably realized in the form of bearing end plates of the electric machine. As a result the constructional design of the electric machine can be kept simple and uncomplicated.

Preferably the air guide element and/or the inner ring element consist of aluminum or an aluminum alloy, i.e. an alloy of various metals among which aluminum forms the main constituent. Aluminum offers a relatively high material strength and yet at the same time a high thermal conductivity. As a result heat can also be discharged to the environment of the electric machine—additionally due to the heat dissipation via the rotor channels and the second, and where relevant also third cooling channels—via the air guide element and/or the inner ring element. Where relevant the outer ring element can also consist of aluminum or an aluminum alloy for similarly based reasons.

The air inlet is preferably arranged on the top side of the casing. This is advantageous for constructional reasons in particular.

The covering elements preferably consist of aluminum, copper, or an aluminum or copper alloy—i.e. an alloy of various metals among which aluminum or copper form the main constituent—or contain blocks of the said materials. Materials of this type have a high thermal conductivity so that they act as an additional direct heat exchanger between the rotor and/or the stator on the one side and the cooling air flow on the other side. Where required the covering elements can additionally have surface-enlarging elements such as pins or cooling fins for example.

According to the invention a chassis of the type referred to in the introduction is configured as a result of the electric machine being realized in the form of an inventive electric machine.

In conjunction with the square outer contour of the electric machine, second cooling channels are preferably arranged at least in the lower of the two corner regions facing toward the wheelset axle. If the electric machine has the third cooling channels, then third cooling channels are preferably arranged at least in the upper of the two corner regions facing away from the wheelset axle. These embodiments enable the inventive electric machine to be used without reducing the ground clearance of the electric machine above a substrate over which the chassis is traveling.

Other features which are considered as characteristic for the invention are set forth in the appended claims.

Although the invention is illustrated and described herein as embodied in an electric machine with improved dissipation of waste heat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
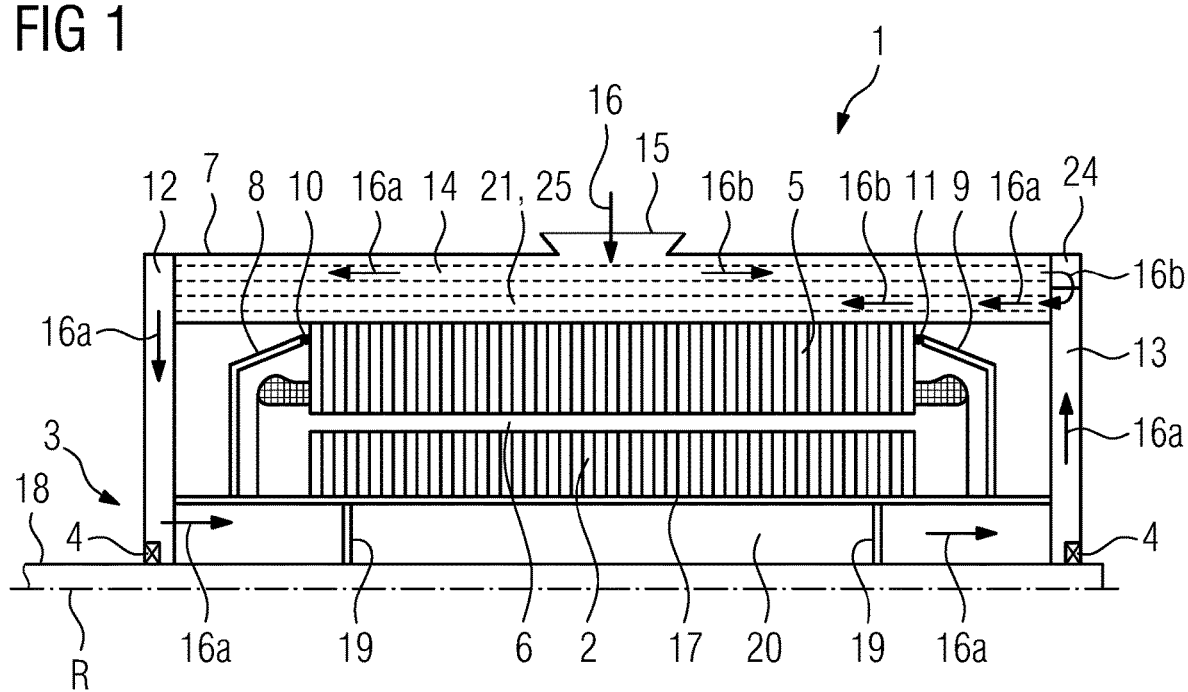
FIG. 1 is a sectional view through half of an electric machine.
Figure 2:
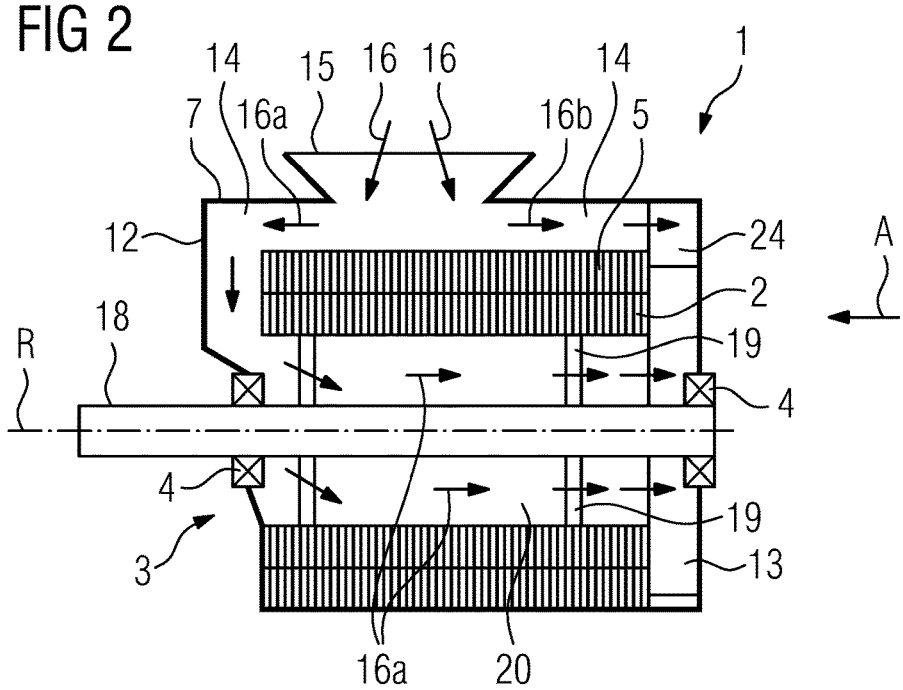
FIG. 2 is a sectional view drawn more roughly than FIG. 1.

Referring now to the figures of the drawings in detail and first, particularly to FIGS. 1 and 2 thereof, there is shown an electric machine 1 has a rotor 2. The rotor 2 is arranged on a rotor shaft 3. The rotor shaft 3 is supported on bearings 4. As a result the rotor 2 together with the rotor shaft 3 is rotatable around an axis of rotation R.

Where the terms "axial", "radial" and "tangential" are used below, they are always in reference to the axis of rotation R. "Axial" is a direction parallel to the axis of rotation R. "Radial" is a direction orthogonal to the axis of rotation R, toward the axis of rotation R or away from same. "Tangential" is a direction which is oriented both orthogonal to the axial direction and also orthogonal to the radial direction. "Tangential" is therefore a direction which, given a constant axial position and at a constant radial distance from the axis of rotation R, is aligned in a circular shape around the axis of rotation R.

The rotor 2 is surrounded radially on the outside by a stator 5. Between the rotor 2 and the stator 5 there is an air gap 6 (only identifiable in FIG. 1). For its part the stator 5 is surrounded radially on the outside by a casing 7.

In regards to the electrical interaction of the rotor 2 and stator 5 the electric machine 1 can be realized as required. It can be an asynchronous machine, a synchronous machine, or a DC machine. Frequently it contains a multi-pole permanently excited synchronous machine, typically with six to sixteen poles. In machines of this type the yokes of the rotor 2 and stator 5 can be implemented in a relatively low manner.

A first covering element 8 is arranged at a first axial end of the rotor 2 and stator 5—referred to below as the A side. By means of the first covering element 8 the rotor 2 and the stator 5 on the A side are enclosed with respect to the environment of the electric machine 1. In like manner a second covering element 9 is arranged at a second axial end of the rotor 2 and stator 5—referred to below as the B side. By the second covering element 9 the rotor 2 and the stator 5 on the B side are enclosed with respect to the environment of the electric machine 1. The covering elements 8, 9 can be realized in the form of disks for example. Where required, a first and a second sealing element 10, 11—for example a labyrinth seal in each case—can additionally be present, as shown in the diagram in FIG. 1, for sealing purposes. The covering elements 8, 10 are preferably fixed firmly to the rotor, i.e. they rotate together with the rotor 2. A firm fixing to the stator would also be possible in principle however. These types of enclosures of the rotor 2 and stator 5 are widely familiar to persons skilled in the art. Consequently the enclosure does not need to be explained in further detail.

Figure 3:
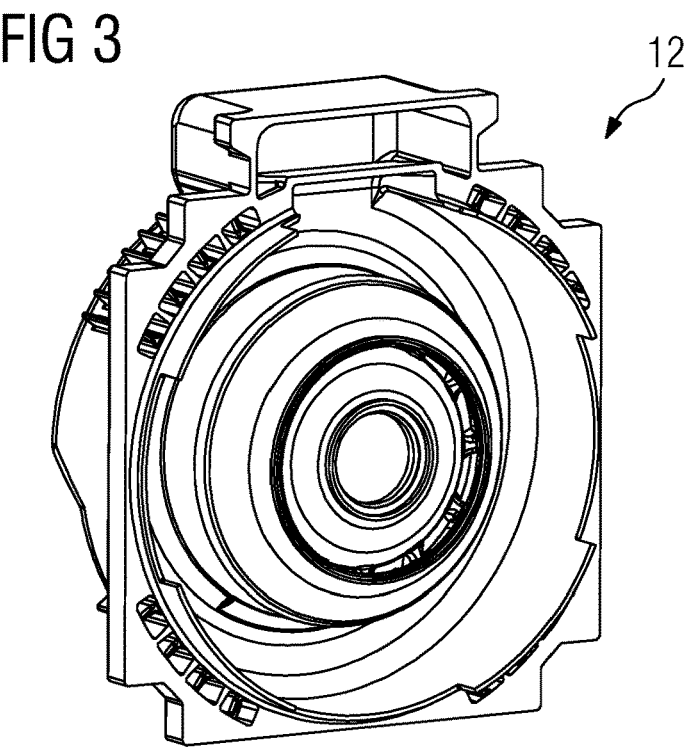
FIG. 3 is a perspective view of an air guide element.
Figure 5:
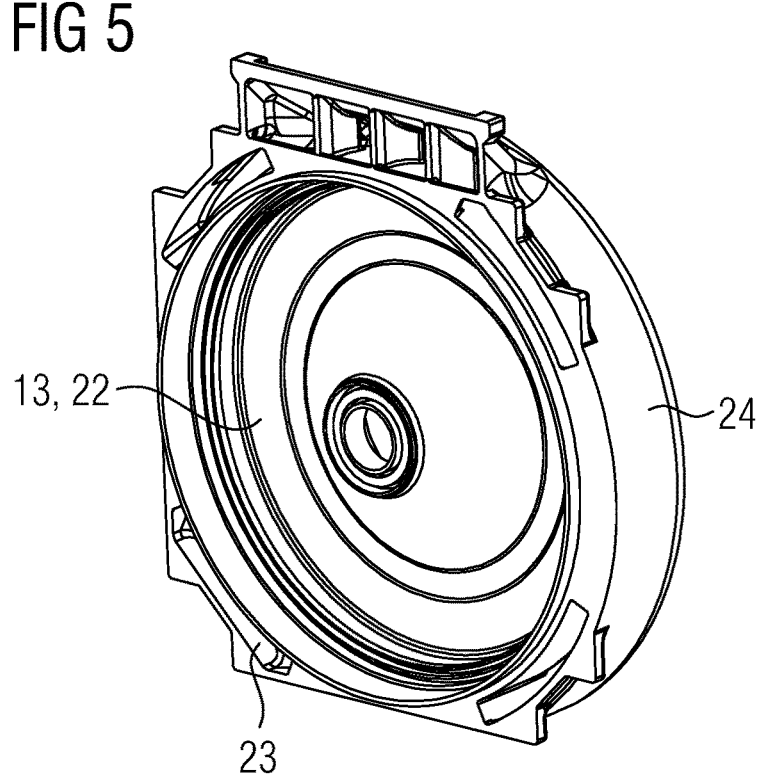
FIG. 5 is a perspective view of an inner ring element.
Figure 6:
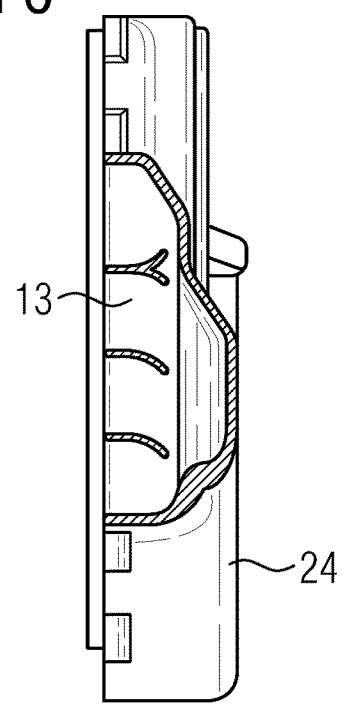
FIG. 6 is a sectional view through the inner ring element shown in FIG. 3.

The first covering element 8 is surrounded radially on the outside, and axially on the side facing away from the rotor 2 and stator 5, by an air guide element 12. FIG. 3 shows a perspective diagram of the air guide element 12, FIG. 4 a section through the air guide element 12. The second covering element 9 is surrounded radially on the outside, and axially on the side facing away from the rotor 2 and stator 5, by an inner ring element 13. FIG. 5 shows a perspective diagram of the inner ring element 13, FIG. 6 a section through the inner ring element 13. In principle the air guide element 12 and the inner ring element 13 can consist of any desired materials. In particular they can consist of steel. Preferably however the air guide element 12 and/or the inner ring element 13 consist of aluminum or an aluminum alloy.

The electric machine 1 has first cooling channels 14. The first cooling channels 14 are arranged relatively at a distance radially on the outside and run axially. In the present case they are placed in the casing 7. Alternatively they can be formed by interspaces between the casing 7 and the stator 5. The first cooling channels 14 are therefore arranged in the casing 7 or between the casing 7 and stator 5. They are closed off tangentially and—apart from in the region of an air inlet 15 (more on this shortly)—likewise closed off radially. A cooling air flow 16 which is fed to the first cooling channels 14 via the air inlet 15 can therefore only escape from the first cooling channels 14 at the axial ends of the first cooling channels 14, but not in the radial or tangential direction.

The casing 7 furthermore has, radially on the outside, the previously mentioned air inlet 15. The air inlet 15 is preferably arranged roughly midway between the two ends of the rotor 2 and stator 5 as viewed in the axial direction. Via the air inlet 15 the likewise already mentioned cooling air flow 16 is fed to the first cooling channels 14—for example by a fan which is not shown. The cooling air flow 16 is fed via the first cooling channels 14 at least partly—see the reference symbol 16*a*—to the air guide element 12. Alternatively the cooling air flow 16 or the corresponding part of the cooling air flow 16 respectively could be fed to an interspace between the first covering element 8 and the air guide element 12. There the cooling air flow 16 or the corresponding part of the cooling air flow 16 respectively is deflected radially to the inside. It is then fed through the rotor shaft 3 to the B side. To this end the rotor shaft 3 can be realized in the form of a hollow shaft for example, which has an outer hoop 17, a hub 18, and spokes 19 in between. The spokes 19 can be continuous as viewed in the axial direction or, as represented in FIG. 2, only arranged at predetermined axial distances from each other. Other embodiments, where for example holes or similar are introduced into the rotor shaft 3, are also possible. Alternatively the rotor channels 20 can also be formed by interspaces between the rotor 2 and the rotor shaft 3, or arranged in the rotor 2 itself. In any case however, rotor channels 20 running axially are arranged in the rotor shaft 3 and/or in the rotor 2, via which the cooling air flow 16 or the corresponding part of the cooling air flow 16 respectively is routed to the B side.

On the B side the cooling air flow 16 or the corresponding part of the cooling air flow 16 respectively is fed to the inner ring element 13. In the inner ring element 13 the cooling air flow 16 or the corresponding part of the cooling air flow 16 respectively is deflected radially to the outside and fed to second cooling channels 21. The inner ring element 13 can have an inner annulus 22 for example, which is connected in a communicating manner to the respective second cooling channel 21 via a respective branch channel 23. According to the diagram in FIG. 5 a single branch channel 23 is present just in one single corner. Branch channels 23 could also be present in multiple corners however. The connection of the branch channel 23 to the annulus 22 is hidden in FIG. 5. It is present however.

Figure 4:
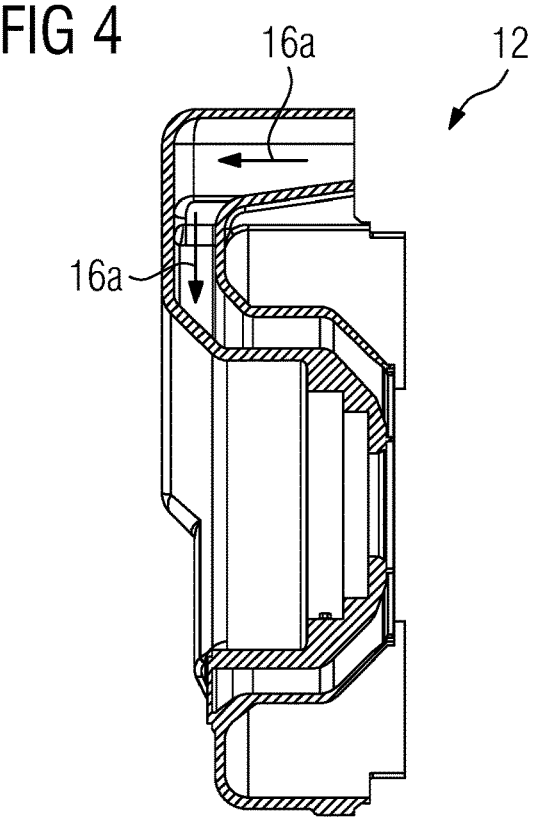
FIG. 4 is a sectional view through the air guide element shown in FIG. 3.

In FIG. 3 and FIG. 4 it is possible to see at the top, for example, the intake aperture for the cooling air flow 16 or the corresponding part of the cooling air flow 16 respectively, via which the cooling air flow 16 or the corresponding part of the cooling air flow 16 respectively is fed to an annulus arranged under the intake aperture. Furthermore cooling fins can be seen in corner regions on the side facing away. The cooling fins represent a continuation of second and/or third cooling channels 21, 25. The second and/or third cooling channels 21, 25, as such, are explained in further detail later.

As an alternative to routing the cooling air flow 16 or the corresponding part of the cooling air flow 16 respectively through the inner ring element 13 it is possible for the cooling air flow 16 or the corresponding part of the cooling air flow 16 respectively to be fed to an interspace between the second covering element 9 and the inner ring element 13, and for the routing of the cooling air flow 16 or the corresponding part of the cooling air flow 16 respectively to be effected through the interspace.

The second cooling channels 21 are—like the first cooling channels 14—arranged relatively at a distance radially on the outside and run axially. In the present case they are arranged in the casing 7. Alternatively they can be formed by interspaces between the casing 7 and the stator 5. The second cooling channels 21 are therefore arranged in the casing 7 or between the casing 7 and stator 5. They are closed off tangentially and radially. Cooling air which is located in the second cooling channels 21 can therefore only emerge from the second cooling channels 21 at the axial ends of the second cooling channels 21, but not in a radial or tangential direction. The cooling air flow 16 or the corresponding part of the cooling air flow 16 respectively is therefore routed axially through the electric machine 1 by the second cooling channels 21. Then the cooling air flow 16 or the corresponding part of the cooling air flow 16 respectively escapes into the environment of the electric machine 1.

At the same time FIG. 1 to FIG. 6 also show various preferred embodiments of the electric machine 1. In particular the inner ring element 13—see further FIG. 7—is surrounded radially on the outside by an outer ring element 24. In some cases the outer ring element 24 can extend completely around the inner ring element 13 as viewed in the tangential direction. In many cases however, as shown in the diagram in FIG. 7, it is sufficient and often even advantageous if the outer ring element 24 only extends over an angular range α of approximately 180° or less, in particular approximately 90° or approximately 45° in the tangential direction. This will become more apparent from later embodiments. It will also be apparent from the embodiments that the angular range α will normally be somewhat over 180°, somewhat over 90°, or somewhat over 45°. Where appropriate the outer ring element 24 can form one constructional unit with the inner ring element 13. For example the inner ring element 13 and the outer ring element 24 can be produced in the form of a unitary casting.

If the outer ring element 24 is present, third cooling channels 25 are furthermore also present. In principle the third cooling channels 25 correspond to the second cooling channels 21 in regards to their arrangement and functioning. They are therefore likewise arranged relatively at a distance radially on the outside, run axially, and are closed off tangentially and radially. In the present case they are placed in the casing 7. Alternatively they can be formed by interspaces between the casing 7 and the stator 5. The third cooling channels 25 are therefore arranged in the casing 7 or between the casing 7 and stator 5. Due to the fact that the third cooling channels 25 are closed off tangentially and radially, cooling air located in the third cooling channels 25 can only emerge from the third cooling channels 25 at the axial ends of the third cooling channels 25, but not in a radial or tangential direction. For example the intake aperture for the corresponding part 16b of the cooling air flow 16 can be seen in FIG. 5. Furthermore branch channels via which the corresponding part 16b of the cooling air flow 16 is fed to the third cooling channels 25 can be seen in three corners—without reference symbols. The connections of these branch channels to the intake aperture for the corresponding part 16b of the cooling air flow 16 are hidden in FIG. 5. They are present however.

If the outer ring element 24 and the third cooling channels 25 are present only part of the cooling air flow 16 is routed via the first cooling channels 14, the rotor channels 20, and the second cooling channels 21. The remaining part of the cooling air flow 16—see the reference symbol 16b—is fed via the first cooling channels 13 directly to the B side. On the B side the corresponding part 16b of the cooling air flow 16 is fed to the outer ring element 24. In the outer ring element 24 the corresponding part 16b of the cooling air flow 16 is deflected tangentially toward the third cooling channels 24 and thus fed to the third cooling channels 25. By means of the third cooling channels 25 the corresponding part 16b of the cooling air flow 16 is routed axially through the electric machine 1. It then escapes into the environment of the electric machine 1.

As an alternative to routing the corresponding part 16b of the cooling air flow 16 through the outer ring element 24 the corresponding part 16b of the cooling air flow 16 can be fed to an interspace between the casing 7 and the outer ring element 24, and routing of the corresponding part 16b of the cooling air flow 16 is effected through the said interspace.

Figure 7:
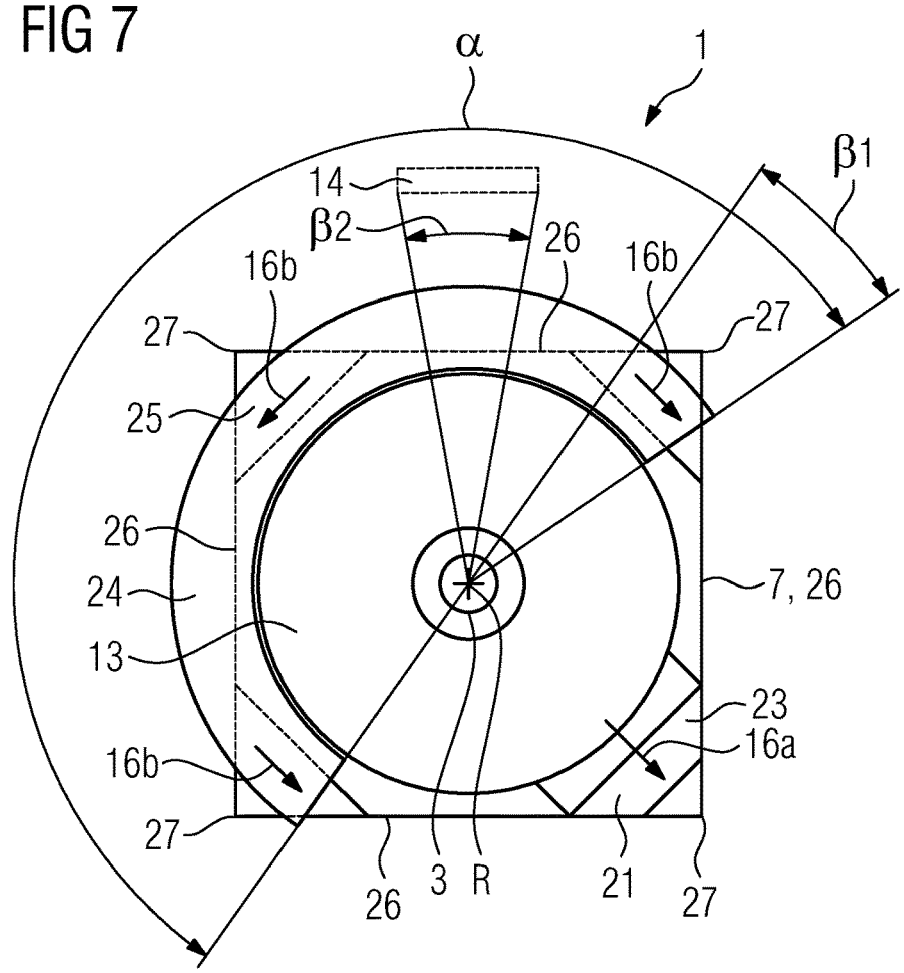
FIG. 7 is an illustration of the electric machine shown in FIG. 2 from a direction A shown in FIG. 2.
Figure 8:
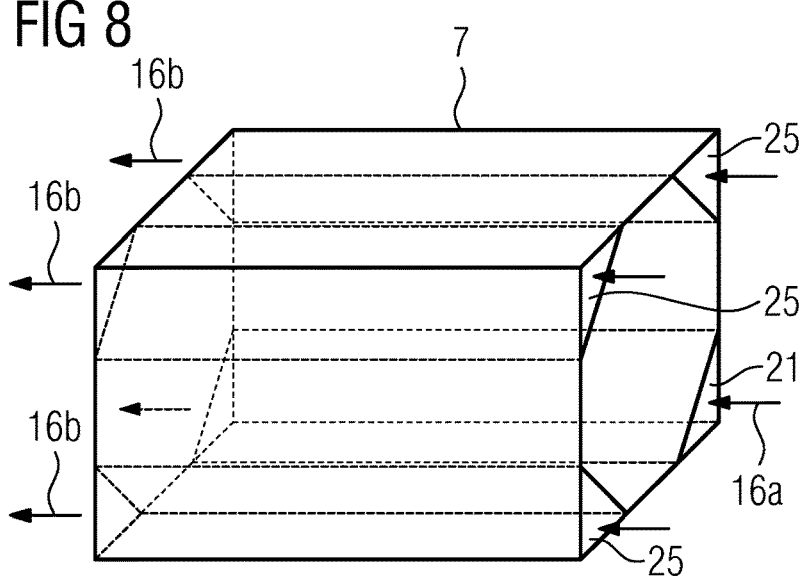
FIG. 8 is a perspective view of a casing of the electric machine shown in FIG. 2.

In practice the casing 7—see FIG. 7 and FIG. 8—frequently has a square outer contour. In this case the first cooling channels 14 are arranged in at least one side region 26 of the outer contour, mostly just in one single side region 26 even. In particular they are arranged in the side region 26 in which the air inlet 15 is also located. The air inlet 15 in turn—regardless of whether a square outer contour is present—is normally arranged on the top side of the casing 7. On the other hand the first cooling channels 14 are not arranged in corner regions 27 of the outer contour.

The second cooling channels 21 and—if present—the third cooling channels 25 also—preferably are arranged in the corner regions 27 of the outer contour on the other hand. The second cooling channels 21 and where relevant also the third cooling channels 25 are not arranged in the side regions 26 on the other hand. If only the second cooling channels 21 are present one or more second cooling channels 21 in each case can be arranged in all four corner regions 27. If both the second and also the third cooling channels 21, 25 are present either second cooling channels 21 or third cooling channels 25 are normally arranged in each corner region 27, but not a mixture of second and third cooling channels 21, 25. In rare exceptions however, a mixture of this type can also make sense.

Preferably therefore solely second cooling channels 21 are arranged in one of the corner regions 27, and solely third cooling channels 25 in another of the corner regions 27. The two corner regions 27 normally lie diametrically opposite each other as shown in the diagram in FIG. 7 and FIG. 8. Either second or third cooling channels 21, 25 can be arranged in the other two end regions 27 according to need. If second cooling channels 21 are arranged in only one single corner region 27 and third cooling channels 25 are arranged in three corner regions 27 as shown in the diagram in FIG. 7, the outer ring element 24 preferably extends over an angular range α of approximately 180° in the tangential direction. If second cooling channels 21 are arranged in two corner regions 27 and third cooling channels 25 are arranged in two corner regions 27, the outer ring element 24 preferably extends over an angular range α of approximately 90° in the tangential direction. If second cooling channels 21 are arranged in three corner regions 27 and third cooling channels 25 are only arranged in one single corner region 27, the outer ring element 24 preferably extends over an angular range α of approximately 45° in the tangential direction. The angular range α of 180°, 90°, or 45° stated in each case is normally exceeded somewhat, specifically by the angle β1 which, as viewed from the axis of rotation R, the third cooling channels 25 each cover in one of the corner regions 27 in each case, where relevant plus around half the angle β2 which, as viewed from the axis of rotation R, the first cooling channels 14 cover in the one side region 26.

The covering elements 8, 9 preferably consist of aluminum, copper, or an alloy containing one of the said metals. As a result they can also function as heat exchangers—in addition to the surfaces of the rotor shaft 3 and of the stator 5 along which the cooling air flows 16, 16a, 16b flow. This also applies if the covering elements 8, 9 consist at least essentially of cast iron, or contain blocks of the said materials for example. Therefore heat can be removed additionally from the enclosed space, in which the rotor 2 and the stator 5 are located, via the covering elements 8, 9. Where required the covering elements 8, 9 can have additional elements which enlarge their surface area, for the purpose of enhancing the heat exchanger function. For example elements of this type comprise pins and cooling fins.

The air guide element 12 and the inner ring element 13 can be independent elements to which no further function is attached beyond routing the cooling air flow 16. Preferably however the air guide element 12 and/or the inner ring element 13 each hold one of the bearings 4 as shown in the diagram in FIG. 1 and FIG. 2. In this case therefore the air guide element 12 and/or the inner ring element 13—where relevant the unit containing the inner ring element 13 and outer ring element 24—are realized in the form of bearing end plates for the electric machine 1 or conversely the bearing end plates of the electric machine 1 take over the function of the air guide element 12 and/or the inner ring element 13.

Figure 9:
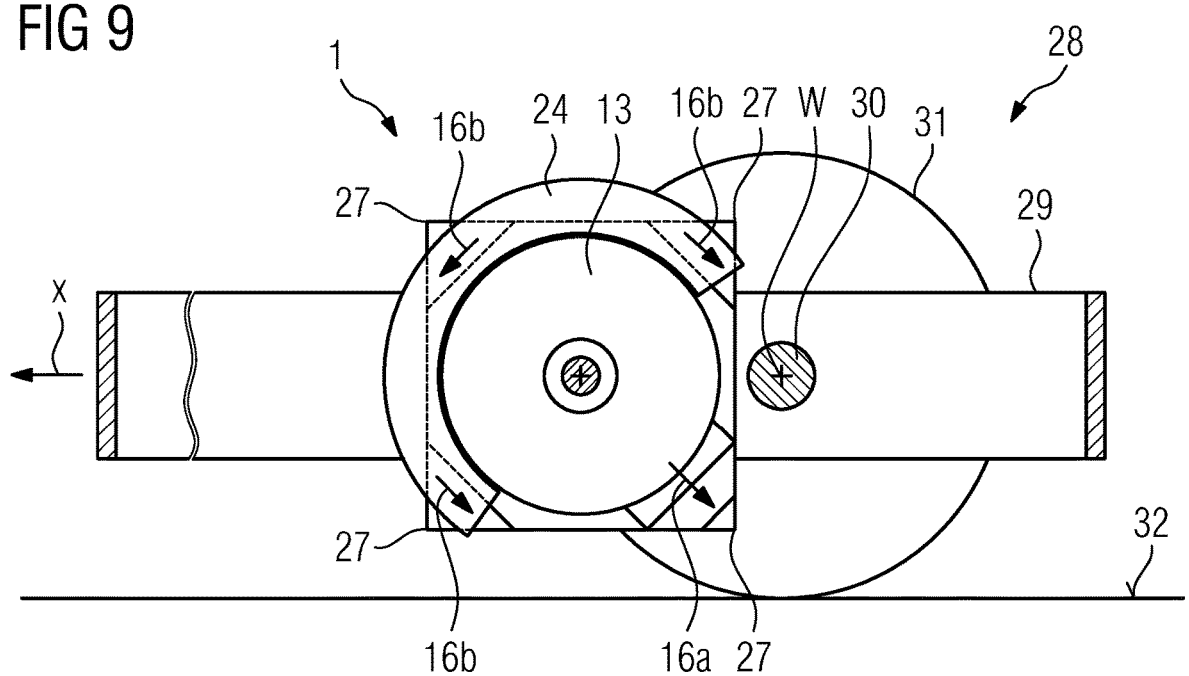
FIG. 9 is a side view of a chassis of a railcar from a direction IX-IX shown in FIG. 10.
Figure 10:
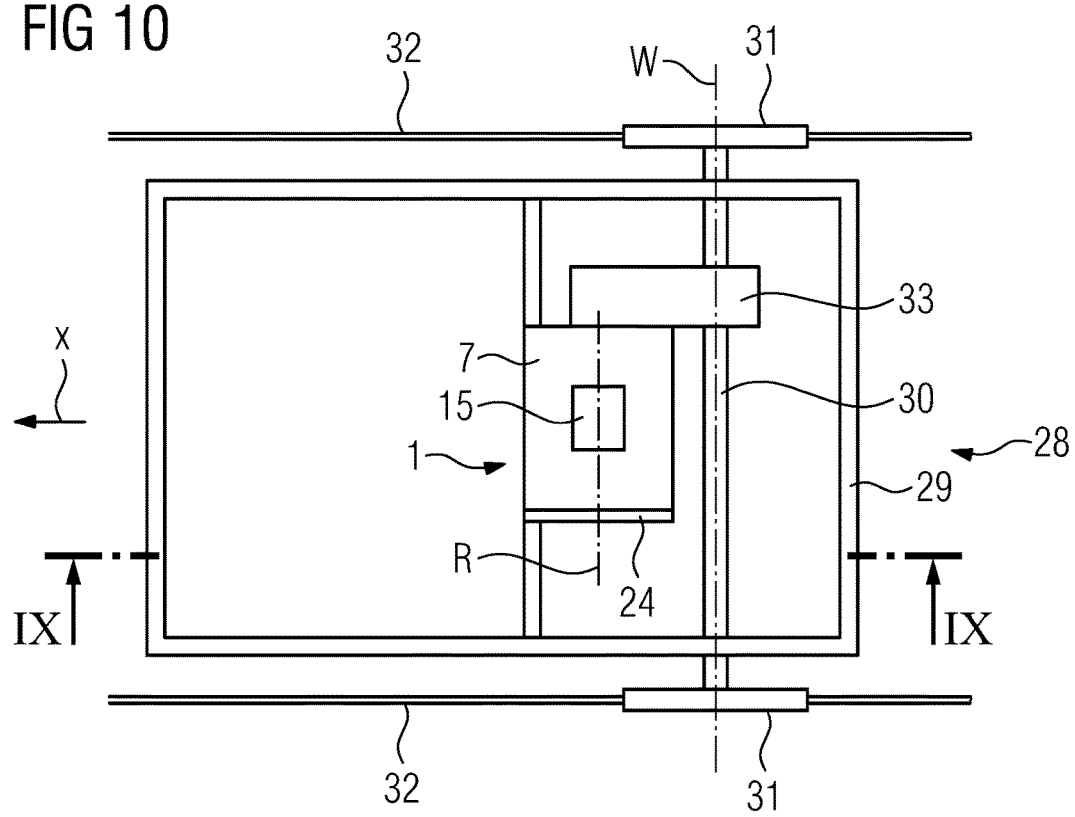
FIG. 10 is a top view of the chassis shown in FIG. 9.

As explained thus far the electric machine 1 of the present invention can be used universally. However in many cases the electric machine 1 of the present invention is a constituent of the chassis 28 of a railcar as shown in the diagram in FIG. 9 and FIG. 10. FIG. 9 shows the chassis 28 from a direction IX-IX (see FIG. 10). The direction IX-IX corresponds to the direction A in FIG. 2. FIG. 10 shows the chassis 28 from above.

The chassis 28 can be a bogie in particular. According to FIG. 9 and FIG. 10 the chassis 28 has a frame 29. A wheelset axle 30 is supported in the frame. The wheelset axle 30 is rotatable around a shaft axis W. By means of wheels 31 arranged on the wheelset axle 30 the chassis 28 can therefore move on a substrate 32 (in particular rails) in a direction of travel x.

Multiple wheelset axles 30 are normally supported in the frame 29. Only the wheelset axle 30 driven by the electric machine 1 is considered in the frame of the present invention however. The other wheelset axles 30 are consequently not shown in FIG. 9 and FIG. 10.

The electric machine 1 is fixed in the frame 29 in front or in rear of the wheelset axle 30 as viewed in the direction of travel x. According to the diagram in FIG. 9 and FIG. 10 the axis of rotation R of the electric machine 1 runs parallel to the shaft axis W of the wheelset axle 30. Alternatively it could also form an angle with the shaft axis W, in particular orthogonal to the shaft axis W. Even if the axis of rotation R forms an angle with the shaft axis W however, the axis of rotation R runs—at least normally—horizontally. The rotor shaft 3 of the electric machine 1 acts on the wheelset axle 30 via a gearbox 33. A clutch which is potentially present is not shown in FIG. 9 and FIG. 10. The electric machine 1 is therefore a traction drive unit of the railcar. In the simplest case the gearbox 33 contains just a gear wheel arranged on the rotor shaft 3 in a torsion-resistant manner, and a gear wheel arranged on the wheelset axle 30 in a torsion-resistant manner, with the two gear wheels meshing with each other. The gearbox 33 can also be realized in a more complex manner however.

In the event that the casing 7 of the electric machine 1 has the square outer contour explained in the foregoing, and furthermore both the second and also the third cooling channels 21, 25 are arranged in the corner regions 27, then second cooling channels 21 are arranged at least in the lower of the two corner regions 27 facing toward the wheelset axle 30 as shown in the diagram in FIG. 9. Third cooling channels 25 are arranged in the upper of the two corner regions 27 facing away from the wheelset axle 30 on the other hand. Second or third cooling channels 21, 27 can be arranged in the two other corner regions 27 according to need.

In summary therefore the present invention relates to the now described subject matter.

An electric machine 1 has a rotor 2 on a rotor shaft 3. The rotor shaft 3 is supported on bearings 4 such that the rotor 2 and the rotor shaft 3 are rotatable around an axis of rotation R. The rotor 2 is surrounded radially on the outside by a stator 5, the stator 5 by a casing 7. Covering elements 8, 9 are arranged at the axial ends of the rotor 2 and stator 5, by means of which the rotor 2 and the stator 5 are enclosed with respect to the environment of the electric machine 1. One covering element 8 is surrounded radially on the outside, and axially on the side facing away from the rotor 2 and stator 5 there, by an air guide element 12, the other covering element 9 by an inner ring element 13. First and second cooling channels 14, 21 running axially are arranged in the casing 7 or between the casing 7 and stator 5. Rotor channels 20 running axially are arranged in the rotor shaft 3 and/or in the rotor 2. The casing 7 has an air inlet 15 radially on the outside, via which a cooling air flow 16 is fed to the first cooling channels 14. The cooling air flow 16 or at least one part 16a of same is fed via the first cooling channels 14 to the air guide element 12 or to an interspace between the one covering element 8 and the air guide element 12, is deflected radially to the inside there, and is then fed via the rotor channels 20 to the inner ring element 13 or to an interspace between the other covering element 9 and the inner ring element 13, is deflected radially to the outside there and fed to the second cooling channels 21, and is then routed by means of the second cooling channels 21 axially through the electric machine 1. Finally it escapes into the environment of the electric machine 1.

The present invention has many advantages. In particular very efficient heat dissipation is possible as a result of heat being removed from the rotor 2 and stator 5 both via the rotor shaft 3 and also via the casing 7. This is enabled by the corresponding enlargement of the surfaces used for transferring heat. The bearings 4 are effectively decoupled in thermal terms from the hot active parts (rotor 2 and stator 5).

Although the invention has been illustrated and described in detail by the preferred exemplary embodiment, the invention is not limited by the examples disclosed, and other variations can be derived from same by a person skilled in the art without departing from the protective scope of the invention.

The invention claimed is:

1. An electric machine, comprising:
a rotor shaft;
a rotor disposed on said rotor shaft and having a first axial end and a second axial end;
bearings supporting said rotor shaft such that said rotor together with said rotor shaft is rotatable around an axis of rotation;
a stator surrounding said rotor radially on an outside and having a first axial end and a second axial end;
a casing surrounding said stator radially on an outside;
covering elements, including a first covering element and a second covering element, disposed at said first axial end and said second axial end of said rotor and said stator, by means of said covering elements said rotor and said stator are enclosed with respect to an environment of the electric machine;
an air guide element surrounding said first covering element radially on an outside, and axially on a side facing away from said rotor and said stator;
an inner ring element surrounding said second covering element radially on an outside, and axially on a side facing away from said rotor and stator;
first cooling channels and second cooling channels running axially in said casing or between said casing and said stator;
rotor channels running axially and disposed in one of said rotor shaft or said rotor;
said casing having an air inlet radially on an outside, and via said air inlet a cooling air flow is fed to said first cooling channels; and said first cooling channels configured to feed at least one part of the cooling air flow to said air guide element or to an interspace between said first covering element and said air guide element, said air guide element alone or in conjunction with said first covering element formed to deflect the at least one part of the cooling air flow radially to an inside, and is then fed via said rotor channels to said inner ring element or to an interspace between said second covering element and said inner ring element, said inner ring element alone or in conjunction with said second covering element formed to deflect the at least one part of the cooling air flow radially to an outside and is then fed to said second cooling channels, and said second cooling channels configured to route the at least one part of the cooling air flow axially through the electric machine, and finally escapes into the environment of the electric machine.

2. The electric machine according to claim 1, wherein:
said casing has a square outer contour as viewed orthogonally to the axis of rotation, said first cooling channels are disposed in at least one side region of said square outer contour; and
said second cooling channels are disposed in corner regions of said square outer contour.

3. The electric machine according to claim 1,
further comprising an outer ring element surrounding said inner ring element radially on an outside at least over part of its periphery;
further comprising third cooling channels running axially and disposed in said casing or between said casing and said stator; and
wherein a further part of the cooling air flow is fed to said outer ring element or to an interspace between said casing and said outer ring element, and is deflected tangentially there and fed to said third cooling channels, and is finally routed by means of said third cooling channels axially through the electric machine, and then escapes into the environment of the electric machine.

4. The electric machine according to claim 3, wherein said outer ring element extends over an angular range of approximately 180° or less as viewed from the axis of rotation.

5. The electric machine according to claim 1, wherein at least one of said covering elements is fixed firmly to said rotor.

6. The electric machine according to claim 1, wherein at least one of said air guide element or said inner ring element holds one of said bearings.

7. The electric machine according to claim 1, wherein at least one of said air guide element or said inner ring element consist of aluminum or an aluminum alloy.

8. The electric machine according to claim 1, wherein said casing has a top side and said air inlet is disposed on said top side of said casing.

9. The electric machine according to claim 1, wherein said covering elements consist of aluminum, copper, an aluminum or copper alloy, or contain blocks of these materials.

10. The electric machine according to claim 1, wherein:
said casing has a square outer contour as viewed orthogonally to the axis of rotation, and said first cooling channels are disposed in precisely one side region of said square outer contour; and
said second cooling channels are disposed in corner regions of said square outer contour.

11. The electric machine according to claim 4, wherein said angular range is approximately 90° or less.

12. The electric machine according to claim 4, wherein said angular range is approximately 45° or less.

13. A chassis of a railcar, the chassis comprising:
a frame;
a wheelset axle supported in said frame such that said wheelset axle is rotatable around a shaft axis;
a gearbox;
an electric machine fixed in said frame in front or in rear of said wheelset axle as viewed in a direction of travel of the chassis, said electric machine containing:
a rotor shaft acting on said wheelset axle via said gearbox;
a rotor disposed on said rotor shaft and having a first axial end and a second axial end;
bearings supporting said rotor shaft such that said rotor together with said rotor shaft is rotatable around an axis of rotation;
a stator surrounding said rotor radially on an outside and having a first axial end and a second axial end;
a casing surrounding said stator radially on an outside;
covering elements, including a first covering element and a second covering element, disposed at said first axial end and said second axial end of said rotor and said stator, by means of said covering elements said rotor and said stator are enclosed with respect to an environment of said electric machine;
an air guide element surrounding said first covering element radially on an outside, and axially on a side facing away from said rotor and said stator;
an inner ring element surrounding said second covering element radially on an outside, and axially on a side facing away from said rotor and stator;
first cooling channels and second cooling channels running axially in said casing or between said casing and said stator;
rotor channels running axially and disposed in at least one of said rotor shaft or said rotor;
said casing having an air inlet radially on an outside, and via said air inlet a cooling air flow being fed to said first cooling channels; and
said first cooling channels configured to feed at least one part of the cooling air flow to said air guide element or to an interspace between said first covering element and said air guide element, said air guide element alone or in conjunction with said first covering element formed to deflect the at least one part of the cooling air flow radially to an inside, and is then fed via said rotor channels to said inner ring element or to an interspace between said second covering element and said inner ring element, said inner ring element alone or in conjunction with said second covering element formed to deflect the at least one part of the cooling air flow radially to an outside and is then fed to said second cooling channels, and said second cooling channels configured to route the at least one part of the cooling air flow axially through the electric machine, and finally escapes into the environment of the electric machine.

14. The chassis according to claim 13, wherein:
said casing of said electric machine has a square outer contour as viewed orthogonally to the axis of rotation; and
said second cooling channels are disposed at least in a lower of two corner regions of said square outer contour facing toward said wheelset axle.

15. The chassis according to claim 14, wherein said electric machine has third cooling channels disposed at least in an upper of said two corner regions of said square outer contour facing away from said wheelset axle.

* * * * *